United States Patent [19]

Gerdt

[11] Patent Number: 4,879,454

[45] Date of Patent: Nov. 7, 1989

[54] FIBER OPTIC FABRICATION FURNACE

[75] Inventor: David W. Gerdt, Charlottesville, Va.

[73] Assignee: Sperry Marine Inc., Charlottesville, Va.

[21] Appl. No.: 240,986

[22] Filed: Sep. 6, 1988

[51] Int. Cl.$^4$ .......................... H05B 1/02; G02B 6/38
[52] U.S. Cl. ..................................... 219/494; 219/350; 219/506; 219/535; 350/96.21; 350/96.1; 350/96.2
[58] Field of Search ............... 219/535, 356, 352, 355, 219/520, 539, 544, 350, 494, 497, 506; 350/96.2, 96.15, 96.16, 96.21, 96.22, 96.10

[56] References Cited

U.S. PATENT DOCUMENTS

| | | | |
|---|---|---|---|
| 1,971,387 | 8/1934 | Scoville | 219/535 |
| 3,548,159 | 12/1970 | Ellstroem | 219/355 |
| 4,336,047 | 6/1982 | Pavlopoulos et al. | 350/96.15 |
| 4,584,464 | 4/1986 | Myer | 219/354 |
| 4,763,272 | 8/1988 | McLandrich | 350/96.21 |

Primary Examiner—M. H. Paschall
Attorney, Agent, or Firm—Seymour Levine

[57] ABSTRACT

An electric furnace for fusing optical fibers has a body made of insulating material. A fiber channel is provided wherein the fibers to be fused are positioned. To facilitate the insertion of the fibers a slot is provided which extends from the fiber channel to the surface of the body. Coil channels are provided around the fiber channel each having an opening to the fiber channel in the fusion area. During the fusion process the fibers are under tension to stretch the coupling region and the light coupling is monitored until the desired level is achieved.

17 Claims, 2 Drawing Sheets

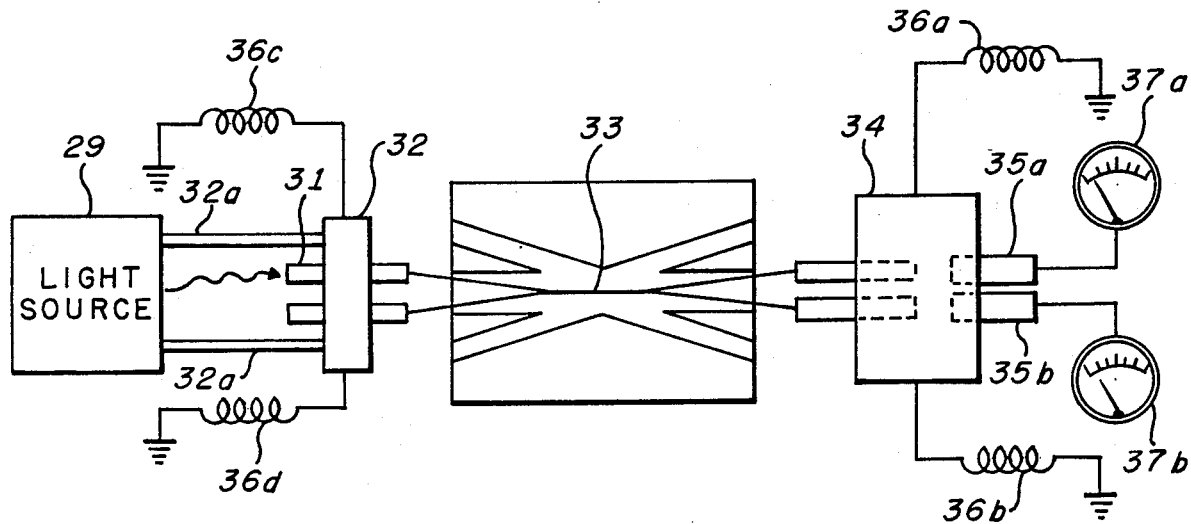
FIG.3.
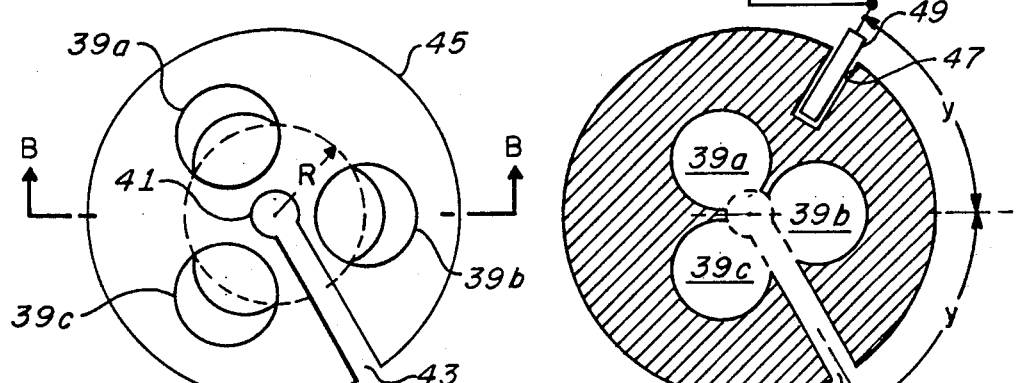
FIG.4A.
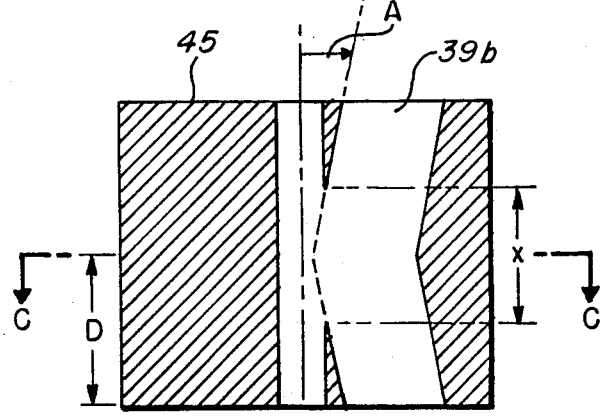
FIG.4B.
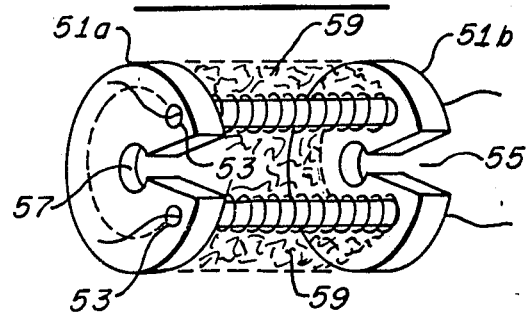
FIG.4C.
FIG.4D.

FIBER OPTIC FABRICATION FURNACE

BACKGROUND OF THE INVENTION

1. Field of the Invention

The invention relates to the field of fusing optical fibers and more particularly to a furnace for performing such fusion.

2. Description of the Prior Art

Coupling of optical signals from one optical fiber to other optical fibers is accomplished in an optical fiber coupler. These couplers comprise an input fiber from which the light is coupled to one or more other fibers. To accomplish this coupling, the buffer material around the cladding is removed over equal distances for each fiber and the exposed sections are fused to form the coupling region. Such fusion has been performed in the prior art by clamping the fibers together and applying heat directly to the aligned exposed sections with a hand held torch. This method requires a highly skilled operator, for the torch must be applied in a very small region, uniformly for a precise time interval, necessitating a great degree of eye-hand coordination and fusion completion judgement. Taper angles which determine the degree of coupling and the coupling efficiency are difficult to control, since the fibers must be drawn while the heat is being applied. Further, the fibers have extremely small cross-sectional areas and are subject to breakage caused by wind turbulence created by the torch.

Some of the difficulties encountered with the hand torch method are alleviated by placing the fibers in a heat conducting tube and applying the torch to the outer surface of the tube. In this method it is difficult to concentrate the heat to the desired coupling region and claddings may be removed or fused in areas where such removal and fusion is not desired.

Another method of the prior art for fusing the optical fibers in the coupling region utilizes a ringed heating coil surrounding the coupling region through which an electric current is passed. As with the heated tube process, heat concentration is difficult to achieve and the temperature in the coupling region difficult to control.

SUMMARY OF THE INVENTION

In accordance with the principles of the present invention a furnace for joining optical fibers comprises a body made of thermal and electrical insulating material. A fiber channel, which runs through the body from end-to-end, and an insertion slot, extending from the fiber channel to the outer surface and runs the entire length of body, are provided for positioning the fibers to be joined. A plurality of coil channels are positioned about the fiber channel, each having openings to the fiber channel that are aligned to establish a heat coupling region that permits heat transfer from the coil channels to the fiber channel and provide heat concentration in the area of the aligned openings. Heat is supplied by coupling an electric current to coils inserted in the coil channels. A slot extending from the outer surface of the body towards the fiber channel may contain a heat sensing device which may be utilized for monitoring and controlling the heat applied to the fiber channel.

The furnace may be positioned to locate the fibers to be coupled in fiber channel and thereafter current may be coupled to the coils to generate heat to the fiber channel until a desired temperature has been achieved. Alternatively, the current may be coupled to the coils and the desired temperature achieved prior to positioning the furnace. When the fibers are in the fiber channel tension is applied which may be prior to the generation of heat. Current is supplied through the coils at a level to provide the desired temperature. Tension is maintained while light signals at the output ends of the fibers, resulting from a light signal coupled to one of the fibers, are monitored until a desired light signal distribution is achieved. At that time the heat is turned down to stop drawing the fibers, while the tension may be maintained until the fibers cool.

BRIEF DESCRIPTION OF THE DRAWINGS

FIG. 3 is a schematic diagram, partially in block form, of a system for fusing optical fibers.

FIG. 4A is an illustration of a furnace body having three coil chambers equiangularly positioned about the fiber chamber.

FIG. 4B is a cross sectional view through the axis B—B of the furnace body shown in FIG. 3A.

FIG. 4C is a cross sectional view through the axis C—C of the furnace body illustrated in FIG. 3A.

FIG. 4D is an illustration of furnace constructed with end pieces separated by coil forms.

DESCRIPTION OF THE PREFERRED EMBODIMENTS

Figure 1:
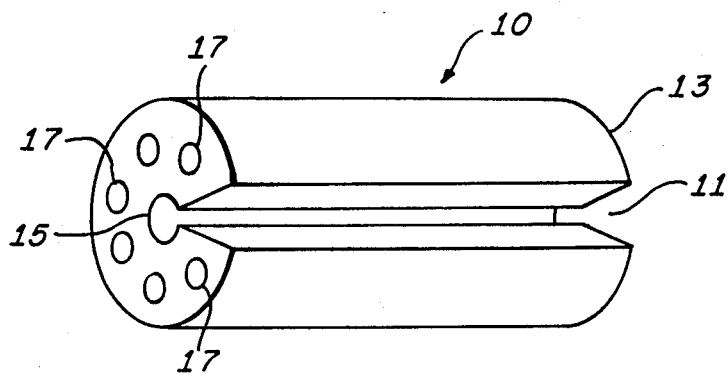
FIG. 1 is ia simplified drawing of a furnace body which may be employed for the invention.

A furnace for fusing optical fibers may have a cylindrical body 10 as shown in FIG. 1. This body may have an axial slot 11 running the entire length and extending from the outer surface 13 to a central fiber channel 15. Slot 11 is dimensioned to permit the easy movement of the furnace over the fiber to locate the fiber in the fiber chamber 15. A plurality of coil channels 17 are provided for the insertion of heating coils that fire the furnace.

Figure 2B:
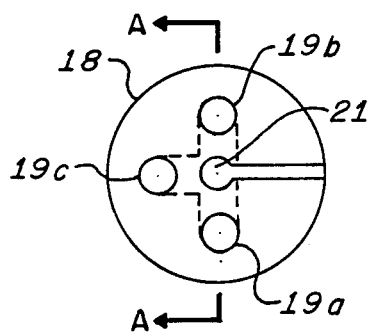
FIG. 2B is an end view of the body shown in cross section in FIG. 2A.
Figure 2A:
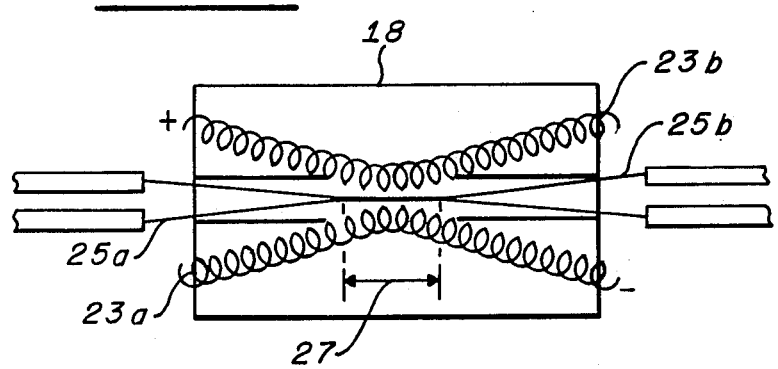
FIG. 2A is a cross sectional view taken along the axis of a furnace body showing therein two of three orthogonally positioned coils and fibers positioned in the furnace.
Figure 2C:
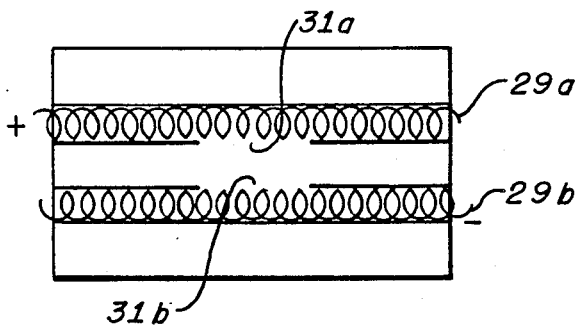
FIGS. 2C, 2D, and 2E show coil configurations which may be employed.

FIG. 2B is an end view of a furnace body 18 wherein three coiled channels 19 equidistant from a fiber channel 21 are positioned in an orthogonal relationship. A cross sectional view of this body through the axis A—A is shown in FIG. 2A with heater coils 23a, 23b shown positioned in the coil channels and fibers 25a, 25b, to be fused, are shown in the fiber channel. The body 18 may be constructed of an insulating material such as alumina, while the coils 23a, 23b may be platinum wire 20 wound around an alumina coil form 22 with semi-circular flat top ends 24. The platinum wire may be held in place with a heat resistant cement 26 applied along the length of the coil and at the flat top of the semi-circular ends 24. Still referring to FIGS. 2A and 2B, the coil channels 19a through 19c have heat passage openings of a length 27 which is chosen in accordance with the fiber fusion length desired. Though not shown in the figure the coils are generally connected electrically in a serial manner, though parallel coupling of the coils may also be used. Though a V-shaped coil is shown in FIG. 2A to provide heat concentration in the fusion region, other coil configurations such as those shown in FIGS. 2C and 2D may be employed. In FIG. 2C straight coils 29a, 29b are shown parallel to the fiber channel. Openings 31a, 31b in the coil channels provide for heat transfer from the coils to the fusion region of the fiber channel. In FIG. 2D arcuate coils 33a, 33b are shown extending into openings 35a, 35b between the coil channels and the fiber channel.

Prior to being placed in the furnace the buffer, and if desired some or most of the cladding on the fibers, are removed and the fibers are positioned so that the exposed sections are in contact. The fibers are held stationary in this position while the furnace is moved over the fiber, through the slot 11, to position the contacting exposed sections in the heat exchanging region between the core channel and the coil channels. The coils may have been energized and the furnace raised to a desired temperature prior to the positioning of the furnace to place the fibers, which may be under tension, in a fiber channel or the coils energized after such positioning. While the heat is applied and the fibers fuse, tension is maintained on the fibers to lengthen the coupling region. The heat and tension are continued until the desired coupling ratios are obtained. At that time the heat is turned down to stop the drawing while the tension is continued. As shown in FIG. 3, light from a light source 29 is coupled to one of the fibers, such as fiber 31 and propagates there through to the coupling region 33 whereat a proportion of the light is coupled to other fibers. Light intensity at the output ends of the fibers are coupled to light detectors 35a, 35b and converted to electrical signals which may be monitored by meters 37a, 37b to determine the degree of coupling achieved. The optical fibers are held in their relative position by clamps 32 and 34, while the light source 29, which may be a pigtail laser diode, maintains its relative position with the optical fibers by rods 32a extending to the clamp 32.

Refer now to FIGS. 4A through 4C wherein a furnace body configuration having coil channels 39a through 39c equiangularly spaced on a circle of radius R from a fiber channel 41. A slot 43 extending from fiber channel 41 to the outer surface 45 of the body is provided for positioning the furnace over fibers to be fused. The radius R is made as small as possible to provide maximum heat transfer with a minimum of intrusion into the fusion region. As shown in FIG. 4b, the furnace body may have V-shaped coiled channels with a channel angle A relative to the axis of the body. This angle determines the intrusion of the coil into the fiber channel and is a factor in determining the effective heating region.

Referring to FIG. 4C, a slot 47 may be provided at an angle y from the axis that is equal to the angle from the axis of the insertion slot 43. Slot 47 extends radially from the surface towards the fiber channel 41 for a preselected distance. A thermocouple 49, or other temperature sensing device, may be inserted into the thermal slot 47 to provide a measure of the temperature in the fiber channel. Though the body is made of an insulating material it will achieve a temperature that is a function of the temperature in the fiber channel. It should be apparent, however, that the sensitivity of this temperature measurement increases with the depth of the thermal channel 47. A signal representative of the temperature in the fiber channel may be coupled to a metering device and to a circuit 52 which in turn may be coupled to the coil terminals for controlling the coil current and thereby the temperature at the coil channel.

Though the invention has been described with a round furnace body, it should be apparent that other cross sectional geometries may be employed, such as squares and hexagons may be employed to achieve similar results.

Figure 2E:
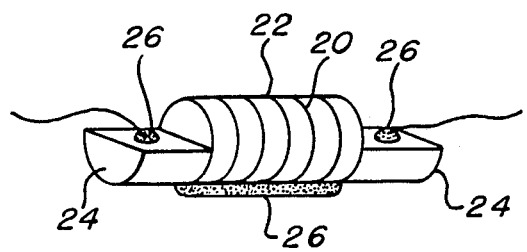
Figure 2D:
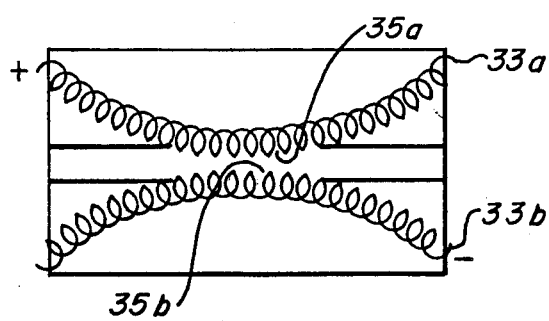

Referring to FIG. 4E, another configuration of the furnace may utilize two identical circular end pieces 51a, 51b having apertures 53 therein through which the semi-circular ends of the coil forms shown in FIG. 2E may be inserted. In this construction the coil, only two of which are shown, for clarity, act as separators between the end pieces which are constructed to provide an insertion channel 55 and fiber chamber 57. After the assembly of coils and end pieces and the fibers for fusion not shown in the figure, are positioned along the axis through the centers of the fiber chambers 57, a suitable insulating wool 59 is packed around the coils and fibers to maintain the heat along the axis 61.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. An apparatus for fabricating fiber optic devices comprising:

a body of thermal insulating material and predetermined geometrical cross-section having a fiber channel extending through said body from a first end thereof to a second end thereof, and a plurality of coil channels positioned about said fiber channel each having openings to said fiber channel at a mutually aligned location whereby heat may pass from said coil channel to said fiber channel, and an insertion slot extending from said first end to said second end of said body and from an outer surface of said body to said fiber channel, thereby providing a passage way for inserting optic fibers into said fiber channel;

coil means positioned in said coil channels for providing heat in response to electrical current flowing therethrough; and means coupled to said coil means for supplying said electrical current.

2. An apparatus in accordance with claim 1 wherein said coil means are electrically coupled in a serial manner.

3. An apparatus in accordance with claim 2 wherein said plurality of coil channels are of number three and are orthogonally positioned about said fiber channel at equal distances therefrom.

4. An apparatus in accordance with claim 2 wherein said plurality of coil channels are of number three and are equally positioned from said fiber channel with equal angular displacements between said coil channels.

5. An apparatus in accordance with claim 2 wherein each coil channel is V-shaped, each having an apex located at said openings.

6. An apparatus in accordance with claim 2 wherein each coil channel is arcuately shaped with said opening in each coil channel at an arc segment closest to said fiber channel.

7. An apparatus in accordance with claim 1 wherein each of said plurality of coil channels extend through said body from said first end to said second end.

8. An apparatus in accordance with claim 7 wherein said coil means are electrically coupled in a serial manner.

9. An apparatus in accordance with claim 8 wherein said plurality of coil channels are of number three and are orthogonally positioned about said fiber channel at equal distances therefrom.

10. An apparatus in accordance with claim 8 wherein said plurality of coil channels are of number three and are equally positioned from said fiber channel with equal angular displacements between said coil channels.

11. An apparatus in accordance with claim 8 wherein each coil channel is V-shaped, each having an apex located at said openings.

12. An apparatus in accordance with claim 8 wherein each coil channel is arcuately shaped with said opening in each coil channel at an arc segment closest to said fiber channel.

13. An apparatus in accordance with claim 1 wherein said coil means are electrically coupled in a parallel manner.

14. An apparatus in accordance with claim 1 wherein said insertion slot is V-shaped.

15. An apparatus in accordance with claim 1 further including means coupled to said body for monitoring said heat provided to said fiber channel.

16. An apparatus in accordance with claim 15 wherein said monitoring means includes:

a slot in said body extending from said outer surface for a predetermined distance towards said fiber channel;

temperature sensing means inserted in said slot for monitoring said heat provided to said fiber channel; and means coupled to said temperature sensing means for determining and controlling heat applied to said fiber channel.

17. An apparatus for fabricating fiber optic devices comprising:

first and second sections of thermal insulating material each having a material free region of predetermined geometrical cross section extending through said thermal insulating material, a fiber insertion slot extending through said thermal insulating material and from an outer surface to said material free region; and apertures about said material free region extending through said thermal insulating material in each of said first and second sections;

coil means positioned in said apertures for providing heat in response to electrical current flowing therethrough and for establishing spacing between said first and second sectons such that an axis is established whereby an optical fiber may be positioned along said axis and extend through said material free regions; and means packed around said coil means and said axis for providing thermal insulation for said coil means and for maintaining heat along said axis.

* * * * *